UNITED STATES PATENT OFFICE.

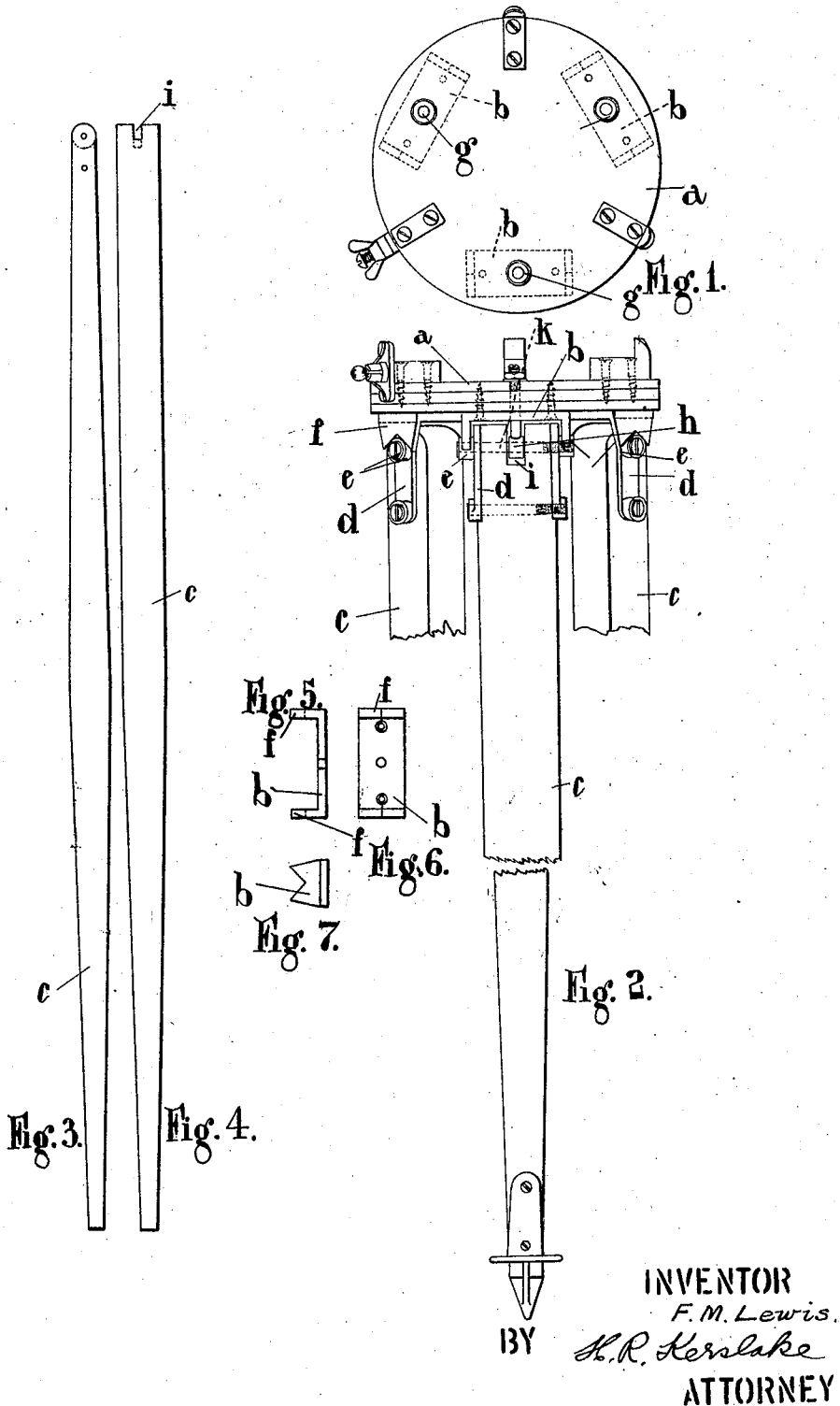

FRANK MICHAEL LEWIS, OF PIMLICO, LONDON, ENGLAND.

TRIPOD AND LIKE SUPPORT.

1,351,390.      Specification of Letters Patent.      Patented Aug. 31, 1920.

Application filed January 4, 1919. Serial No. 269,729.

*To all whom it may concern:*

Be it known that I, FRANK MICHAEL LEWIS, a subject of the King of Great Britain and Ireland, and residing at 16 Lupus street, Pimlico, London, S. W. 1, England, have invented certain new and useful Improvements in Tripods and like Supports, of which the following is a specification.

This invention relates to tripods and like supports and is applicable for any purpose for which such devices may be employed.

Rigidity of support is usually a great desideratum in connection with devices of this nature, but that very rigidity is usually destroyed in such devices as hitherto adopted by providing the legs or extensions with resilient jaw members or forming the same with a certain amount of elasticity therein in order that the legs may be tightened against the table or the like of the tripod or support.

It is the object of my invention to provide means whereby the tripod may be adjusted in any desired manner while providing for the maximum rigidity of support, and the invention consists in a tripod or the like in which each leg or extension is adapted to be drawn up tight against the table or the like or a fitting in connection therewith so that it contacts at four points with the table or fitting whereby great rigidity is obtained and such rigidity is not in any way impaired or interfered with by the construction of the legs or extensions which may be of more or less solid formation at their upper parts or at the parts adjacent to the table or like fitting.

The invention also consists in the provision of V-blocks upon the table or the like by means of which and coöperating tightening screws the legs may be tightened in any desired position.

The invention also consists in the form of tripod or the like hereinafter described or indicated.

The accompanying drawings illustrate one convenient form of tripod in accordance with the invention:

Figure 1 is a plan;

Fig. 2 is an elevation with parts broken away;

Figs. 3 and 4 are views on a smaller scale showing one form of leg; and

Figs. 5 to 7 are views illustrating a detail.

In carrying my invention into effect in one convenient manner I provide upon the under side of the table *a* or the like of the stand three inverted V blocks *b*—one for each leg or extension *c*. The upper end of each leg I make preferably of a rounded or circular formation (as shown clearly in Fig. 3), and upon each side of each leg I provide a plate or fitting *d* having a pin or rounded projection *e* thereon so that the projections bear within the V-shaped flanges *f* of the blocks *b*. Instead of such an arrangement I may provide upon each side of the leg a circular or other metal plate or the like which may, if desired, be flush with the outer face of the leg but which projects slightly above the upper surface of the leg so as to provide a bearing surface against the V block, it being evident that, in either arrangement when the leg is drawn up tight into the block there will be four bearing points for each leg, two on each side.

Any suitable means may be adopted for tightening the legs, as, for example, I may provide for each a bolt *g* having an eye *h* located in a small slot *i* in the upper part of the leg (of a size not to interfere with the rigidity of the leg) and engaging a pin *k* passing through the leg, the axis of which contains the center of the arc to which the upper part of the leg is struck. The bolt passes through the table and may be tightened by means of a nut or the like and the boss is preferably so arranged that when tightened its axis is coincident with the center line of the V block or parallel to the center lines of the V flanges and contains the center of the semi-cylindrical portion of the leg.

The legs are preferably of rectangular section at the top, gradually changing to circular section at the middle and then tapering off to a point at the bottom. The legs may be made in the manner adopted in making hollow masts, that is to say, a piece of wood is divided longitudinally and hollowed out, the two parts being then glued together and the outside then shaped.

Having now described my invention, what I claim as new and desire to secure by Letters Patent is:—

1. A tripod or like support comprising in combination a plurality of legs, a fitting supported thereby, and means for causing each of said legs to contact firmly with the fitting at four points, substantially as described.

2. A tripod or like support comprising a plurality of legs, a fitting supported thereby, cylindrical bearing surfaces upon said legs, V blocks upon said fitting, and means for drawing the bearing surfaces firmly into contact with said V blocks, substantially as described.

3. A tripod or like support comprising a plurality of legs, each of which is substantially of rectangular section at its upper end, gradually changing to circular section in the middle and tapering off toward the bottom, a fitting supported upon said legs and means for drawing said fitting and said legs firmly into contact so that each leg contacts at four points with said fitting, substantially as described.

4. A tripod or the like in which each leg is made substantially solid at its upper part and has two cylindrical bearing surfaces engaging V-shaped blocks, plates or the like, substantially as described.

5. A tripod or the like as claimed in claim 2, in which each leg is adapted to be drawn tight into position by means of a bolt pivoting about a pin or the like passing through the upper part of the leg, substantially as described.

In testimony whereof I have signed my name to this specification.

FRANK MICHAEL LEWIS.